United States Patent [19]

Vennesland et al.

[11] Patent Number: 4,832,803
[45] Date of Patent: May 23, 1989

[54] REMOVAL OF CHLORIDES FROM CONCRETE

[76] Inventors: Oystein Vennesland, Hoiseth, Moholtan, 7000 Trondheim; Ole A. Opsahl, Milorgun. 55, 3035 Drammen, both of Norway

[21] Appl. No.: 100,834

[22] Filed: Sep. 25, 1987

[51] Int. Cl.$^4$ .................................................. C25B 1/26
[52] U.S. Cl. ..................................... 204/130; 204/94; 204/128; 204/147; 204/294
[58] Field of Search ............... 204/128, 130, 147, 196, 204/294, 94

[56] References Cited

U.S. PATENT DOCUMENTS 4,470,892  9/1984  Gupta et al. ................ 204/294
4,692,066  9/1987  Clear .......................... 204/196

FOREIGN PATENT DOCUMENTS 2140456A  11/1984  United Kingdom ............... 204/196

OTHER PUBLICATIONS

J. E. Slater, "Eletrochemical Removal of Chlorides from Concrete Bridge Decks", *Materials Performance*, Nov. 1976, pp. 21-26.
ENR, Reprint from Engineering News-Record of Jul. 11, 1985, 1 page.
Ferex 100, Raychem Brochure, Feb., 1984, 2 pages.

*Primary Examiner*—T. Tung
*Attorney, Agent, or Firm*—Schweitzer & Cornman

[57] ABSTRACT

A method for removal of chlorides from reinforced concrete, where an electrical voltage is applied between the reinforcement of the concrete and an electrolytic medium on the concrete surface. The electrolytic medium is a type that can absorb chlorides, such as retarded gunite. The medium is applied to the concrete surface after an electrode element is attached to the surface of the reinforced concrete.

11 Claims, 1 Drawing Sheet

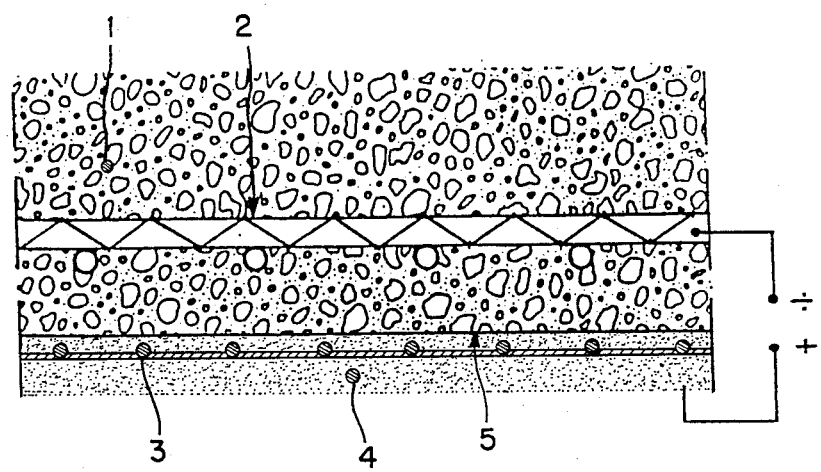

REMOVAL OF CHLORIDES FROM CONCRETE

The present invention concerns a method, for removal of chlorides from reinforced concrete.

The most serious problems in maintaining reinforced concrete construction are caused by corrosion of the reinforcement. The primary reason for corrosion of reinforcement is that the concrete adjacent to the reinforcement loses its ability to provide corrosion protection because of formation of carbonate or because of a high content of chlorides.

To repair concrete construction that is damaged by corrosion it is essential that chloride contaminated concrete or concrete that has been exposed to carbonate formation adjacent to the reinforcement is removed before application of repair concrete (normally by spring). This is also true in the area where the development of the damage is small. If it is not removed the damage will in time become greater. Concrete that is damaged by corrosion can be removed by chiselling. This is however expensive, especially on vertical and downward facing surfaces.

If the corrosion of the reinforcement is caused by a too high chloride content, it is a realistic alternative to remove the chlorides by application of direct current electricity.

This process is well known for this type of removal of chlorides (Slater, J. E., Materials Performance, November 1976, pp 21–26). This method is based on applying an electric field between the reinforcement and an electrolyte on the concrete surface with the reinforcement as the negative pole. Because of the electric field of the negative chloride ions will migrate through the concrete away from the negative electrode and out into the electrolyte where they are oxidized to chlorine gas on the positive electrode or react chemically components in the electrolyte. The rate of the chloride transport, also called electro-migration, depends on the field intensity.

Slater's experiments were carried out on chloride contaminated bridge decks where the reinforcement corroded. The electrolyte used was a $Ca(OH)_2$-solution, both with and without ion exchanger. Without ion exchanger chlorine gas developed on the electrodes that were platinized titanium electrodes. By means of wooden frames having a seal against the concrete surface, the bridge deck was diveded into sections of 3,5 $m^2$ that were individually treated. Slater used voltages of between 100 and 120 V, and the current varied between 28 and 100 A per section. With these parameters up to 90% of the chlorides in the concrete were removed within 24 hours.

This technique has not been useful. This is caused by the following disadvantages or reasons:

1. The high amounts of energy that Slater states as necessary are prohibitive, both for security (min. 54 V) and economic reasons (a surface of 100 $m^2$ needs a generator that can supply 100 V and at least 1350 A).

2. The method is feasible only for the upper surface of horizontal plates or slabs, because a liquid electrolyte is used.

3. This method is intended for removing chlorides in concrete on the upper surface of horizontal slabs. Removal of concrete from horizontal surfaces by mechanical methods is a relative simple operation and therefore not expensive. Slater's method for removal of chlorides in concrete on horizontal surfaces is expensive compared to simple, mechanical methods.

The main object of the present invention is to provide a method that requires smaller amounts of energy and one that can be used not only on horizontal surfaces but others and is less expensive than the existing known method.

This is solved by using a method in accordance with the present invention, where one, by allowing the slow removal of chlorides can reduce the necessary requirement of current and voltage dramatically. It is advantageous to use an electrolyte different from $Ca(OH)_2$-solution, in order that other types of surfaces can be treated. The main demands on such an electrolyte are that it should have a high conductivity and that it should adhere to vertical surfaces and to downward facing surfaces. The electrolyte also must be easy to remove and may not cause a reduction in the adhering ability of any possible subsequent repair concrete. Extremely retarded concrete seems to fulfill all the requirements. This electrolyte can also be applied by using the same equipment that is used in connection with the subsequent repair concrete.

The method in accordance with the present invention will be described more in detail with reference to the drawing that shows a vertical section through concrete construction having reinforcement. The concrete construction 1 has a downward facing surface 5 on which a coating 4 having electrolytical properties has been applied. In this coating is incorporated an electrode net 3. The reinforcement 2 of the concrete construction and electrode net 3 are connected to the negative and to the positive pole of a direct current source respectively.

The method according to the invention can be carried out as follows:

At first core samples are taken from the reinforced concrete to analyze the content of chloride. Thereafter graphite electrode nets 3 are fastened on the surface of the reinforced concrete by "shoting" or other suitable fasteners. These electrodes can be stiff or flexible. Each net 3 has a terminal for connection to a current source. A layer of a viscous medium 4 that is 1–2 cm thick and can absorb chlorides and still maintain its properties for a sufficient time, e.g. retarded gunite, is then applied and the electrical current is connected. Thereafter samples are regularly taken from the gunite in order to determine the increase of the chloride content. After a sufficient time, depending on the content of chloride in the concrete, core samples are taken that are analyzed with regard to the content of chlorides. The coating that is applied, which in the example is retarded gunite, is easy to remove when it has been used, because it can be washed away with water or be removed by simple mechanical means. When the gunite has been removed the graphite nets are removed and the surface is sandblasted. The repair concrete can be sprayed onto it by using the same equipment which was used for application of the retarded gunite electrolytical coating. The use of the previous coating does not result in a reduction in the adhering ability of the repair concrete. Retarded gunite is a cementatious grout to which a setting retarder, i.e. sugar, has been added. The use of sugar or other chemicals to slow or retard the setting action of concrete has been known in the prior art for many years.

This invention implies remarkable advantages compared with prior art. By using the method in accordance with the invention the required amount of current and voltage can be dramatically reduced, and one also can treat other surfaces rather than just horizontal surfaces. The method also is less expensive than present known methods.

We claim:

1. A method for removal of chlorides in concrete having reinforcing members embedded therein, the method comprising:
    (a) suitably attaching a thin net electrode to the outer surface of the reinforced concrete;
    (b) applying a thin, electrolytic layer of a viscous, self-adhering, set-retarded material to the outer surface of the reinforced concrete so as to cover said net electrode;
    (c) applying a relatively low level, direct current between the reinforcing members and the net electrodes so as to cause the chloride ions within said concrete to migrate to said electrolytic layer;
    (d) determining the chloride migration level in said electrolytic layer and disconnect the electrical current when the level reaches a predetermined concentration.

2. A method for removal of chlorides from reinforced concrete as defined in claim 1, wherein the method further includes the step of removing said electrolytic layer and net electrode from the surface of the treated reinforced concrete when the desired chlorine removal level has been reached.

3. A method for removal of chlorides from reinforced concrete as defined in claim 2, wherein the net electrode is formed from graphite fibers having high electrical conductivity.

4. A method for removal of chlorides from reinforced concrete as defined in claim 2, wherein said electrolytic material is retarded gunite.

5. A method for removal of chlorides from reinforced concrete as defined in claim 4, wherein said retarded gunite is applied to the outer surface of the reinforced concrete by spraying whereby the surface in any position can be covered in a thin layer.

6. A method for removal of chlorides from reinforced concrete as defined in claim 4, wherein said retarded gunite is removed by washing with a stream of water from the surface of said reinforced concrete.

7. A method for removal of chlorides from reinforced concrete as defined in claim 2, wherein the electrolyte layer has a thickness of 1–2 centimeters.

8. A method for removal of chlorides from reinforced concrete as defined in claim 2, wherein the negative pole of said direct electrical current is applied to the reinforcing members within said concrete and the positive pole is connected to the net electrode.

9. A method for removal of chlorides from concrete having reinforcing members embedded therein, the method comprising:
    (a) suitably attaching a thin net electrode fabricated from graphite fibers to the outer surface of the reinforced concrete;
    (b) applying a thin layer of retarded gunite to the outer surface of the reinforced concrete so as to cover said net electrode, said layer being approximately 1–2 centimeters in thickness;
    (c) applying a relatively low level, direct current between the reinforcing members and the net electrode, the negative pole of said direct current being applied to the reinforcing members;
    (d) determining the chloride migration level in said retarded gunite layer and disconnecting the electrical current field when the level reaches a predetermined concentration; and
    (e) removing said layer of retarded gunite from the outer surface of said reinforced concrete by washing with a stream of water and removing the net electrode from the surface when the desired chlorine removal level has been accomplished.

10. A method for removal of chlorides from reinforced concrete as defined in claim 9, which further includes the step of sand blasting the outer surface of the treated reinforced concrete and applying a layer of repair concrete to the treated surface.

11. A method for removal of chlorides from reinforced concrete as defined in claim 10, wherein said retarded gunite and the repair concrete are applied to the outer surface of the reinforced concrete by spraying.

* * * * *